ELECTRICAL IDENTIFICATION SYSTEM

Filed Dec. 23, 1954 2 Sheets-Sheet 1

Inventor
HANS HELMUT ADELAAR
FRANS CORNELL LEO De WIT
By Robert Harding Jr.
Attorney Nov. 17, 1959 H. H. ADELAAR ET AL 2,913,531

ELECTRICAL IDENTIFICATION SYSTEM

Filed Dec. 23, 1954 2 Sheets-Sheet 2

INVENTORS.
HANS HELMUT ADELAAR
FRANS CORNELL LEO DE WIT
BY
Robert Harding Jr.
ATTORNEY United States Patent Office 2,913,531

Patented Nov. 17, 1959

2,913,531

ELECTRICAL IDENTIFICATION SYSTEM

Hans Helmut Adelaar and Frans Corneel Leo De Wit, Antwerp, Belgium, assignors to International Standard Electric Corporation, New York, N.Y., a corporation of Delaware Application December 23, 1954, Serial No. 477,319

Claims priority, application Netherlands January 11, 1954

7 Claims. (Cl. 179—18)

Figure 1:
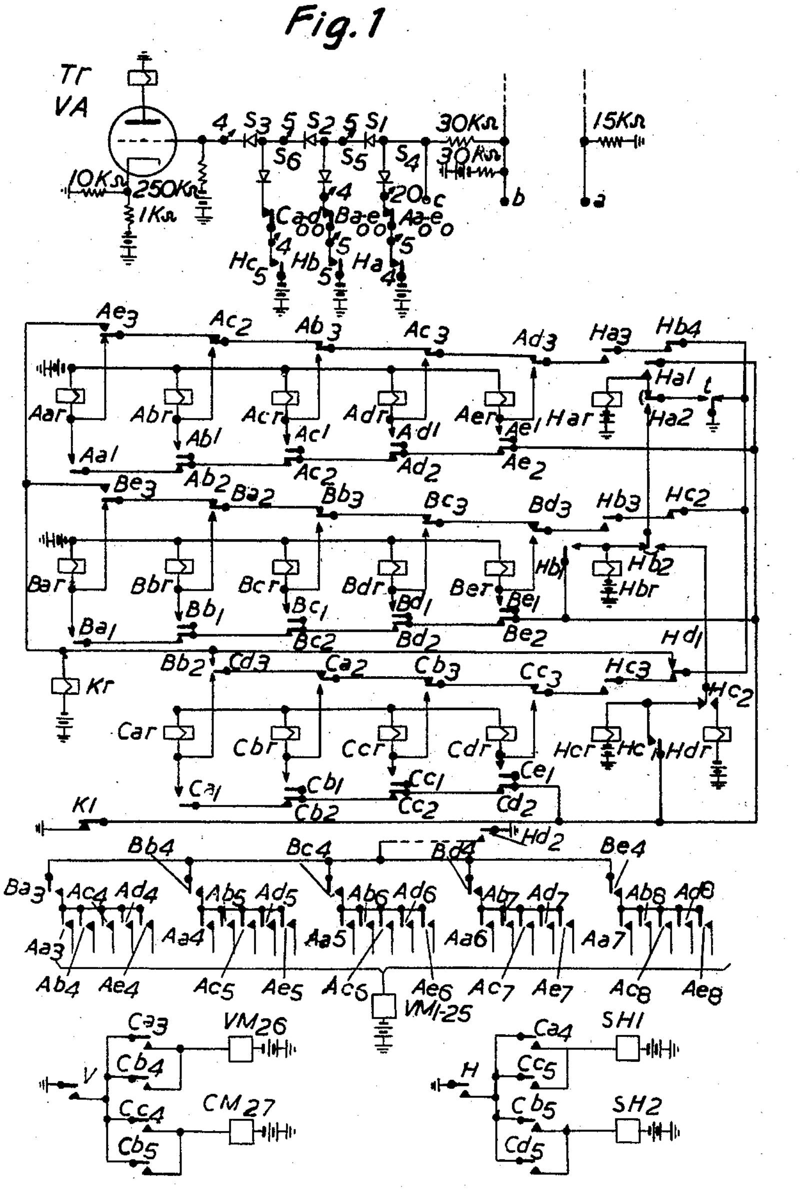

The invention relates to an electrical identification system and more particularly to one which can cause a code recording to be made characterizing the presence of a signalling condition on one out of a plurality of individual points.

Such identification problems are frequently met in telephone systems and for example in relation to the detection and the identification of a calling condition on a subscriber's line. In this respect, it is already known to use a common call detector which will produce a signal when a calling condition has arisen for one line out of a group and as a result thereof to start a rotating switch serving that group until the latter arrives in a position corresponding to the calling line, the physical position of the switch wipers permitting identification of the calling line. This switch might of course, be a line finder and in that case all that is required is that it should be positioned on the calling line. When crossbar switches are used as line finders, it is not desirable to make them hunt for a calling condition on one of the lines to which they have access, since this would take an unduly long time. A separate identifying arrangement is then required and such an arrangement has been described, for example, in the application of W. Pouliart et al., Serial No. 167,752, filed June 13, 1950. In this patent, a switch which is actually an electronic scanning arrangement continuously scans a group of lines and effects temporary but continuously repeated connections with each line during particular time intervals within a cycle each of which identifies a particular line, so that whenever a calling condition arises, this can be detected within the cycle period and at the same time the identity of the calling line can also be registered. If M is the number of lines forming a group and T the time necessary for the scanner to move from one line to the next, a maximum time MT will be required to detect and identify a calling line. If the number of lines in a group is appreciable, e.g. $M=100$, T should be rather small if a calling line is to be detected and identified within a short period of time, e.g. less than half a second. In the above mentioned application, T was made quite small by using a pulse controlled electronic scanner.

The object of this invention is to permit an immediate detection of the appearance of a signalling condition at one individual point out of a plurality, together with a rapid identification of this individual point and within a maximum time which instead of being proportional to the total number of individual points is proportional to an appreciably smaller number.

In accordance with a characteristic of the invention an electrical identification system is provided comprising a plurality of points which are to be identified and a common point connected to each of the individual points via gates arranged in stages. There are a plurality of gates at the first stage all connected to the common point and each connected in turn to a different set of gates at the second stage, each gate of a set being in turn connected to a different set of gates at the next stage. This arrangement is repeated, until at the last stage there is a gate for each individual point to be identified.

There may be said to be $M1 \times M2 \times \ldots \times M_{n-1} \times M_n$ individual points, where M1, M2 . . . $M_{n-1}$, $M_n$ are the respective numbers of the gates in each set at the stages 1, 2, . . . $n-1$, and $n$, $n$ being greater than 1. The gates of each set of gates at a stage are individually controlled from a corresponding set of control points, corresponding gates of each set of a stage being controlled from the same one of the control points of the corresponding set. For example, the individual gates M1 of the first stage are respectively controlled from control points M1; the individual gates $M1 \times M2$ at the second stage have corresponding gates of each set M2 controlled respectively from the control points M2, and so on for successive stages, until the individual gates, $M1 \times M2 \times \ldots M_{n-1} \times M_n$ of the last stage have corresponding gates of each set $M_n$ of the $M1 \times M2 \times \ldots M_{n-1}$ sets controlled respectively from the control points $M_n$.

A detector is connected to said common point and reacts upon a signal being able to reach it from any of said individual points with the characteristic that a series of $n$ multi-stable electrical devices having respectively at least $M_1$, $M_2$, . . ., $M_{n-1}$, $M_n$ stable positions are provided, one for each set of control points at each stage. A first electrical condition is normally applied to all the control points which makes all gates unidirectionally conductive all in the same sense with respect to said common point, whereby a signalling condition at one or more of the individual points will actuate the detector. Means are provided as a result thereof to cause a second electrical condition to be applied to all the gates at one stage which makes them non-conductive, whereby the detector releases. Means are provided as a result thereof to cause the multistable device corresponding to the stage of non-conductive gates to be successively driven from one of its stable conditions to the next, resulting in the separate application of said first electrical condition to each successive control point at said stage until the detector is again actuated. Means are provided to cause said multi-stable device to remain in the position which permitted the detector to be actuated and to cause said second electrical condition to be applied to all the gates at another stage, whereby these gates become non-conductive and the detector is again released with corresponding results, these operations being continued until the last of said multi-stable devices is set into the position which permits the detector to be actuated, whereby the various positions of the $n$ devices indicate the identity of an individual point at which a signalling condition was originated, the disappearance of said signalling condition causing the release of the detector which in turn causes said first electrical condition to be again applied to all control points.

Figure 2:
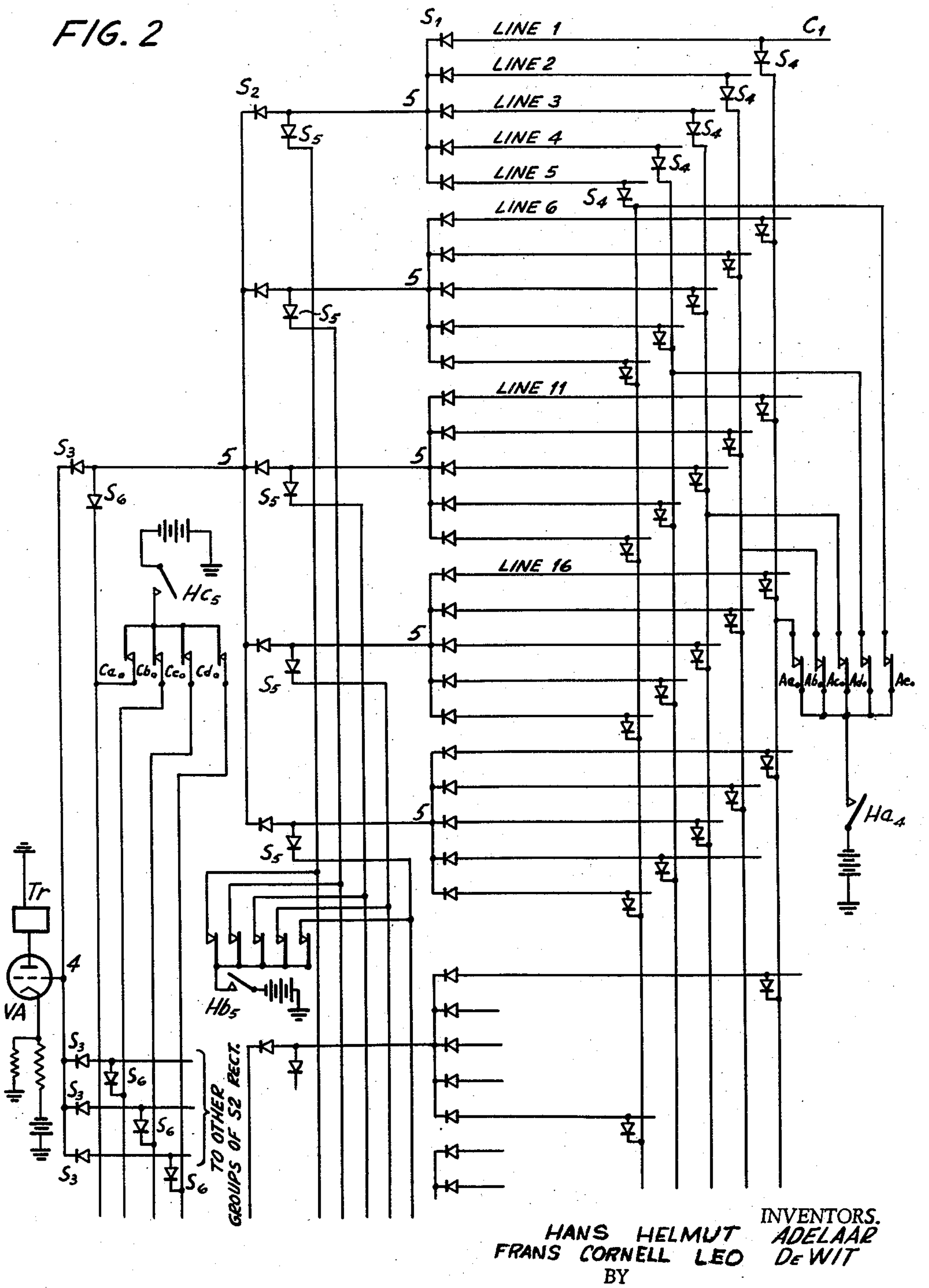

The above mentioned and other objects and characteristics of the invention will be better understood from the following description of an embodiment to be read in relation with the accompanying drawings in which:

Fig. 1 represents the identification equipment necessary for identifying a calling telephone line out of a group of one hundred lines, and Fig. 2 is a detailed circuit of the input connection to the tube VA of Fig. 1.

The system is adapted to react to voltage variations in the line circuit so that relayless line circuits can be used. As shown, the "$a$" wire of the subscriber's line is connected to ground through a resistor of 15 kilo-ohms while the "$b$" wire is connected to the negative pole of a 48 volt battery through a resistor of 30 kilo-ohms. The "$b$" wire is also connected to the control grid of a triode VA through a resistor of 30 kilo-ohms in series with three rectifiers $S_1$, $S_2$, $S_3$. This control grid is connected to −48 volts through a resistor of 250 kilo-ohms. The anode of VA is connected to ground through the winding of a relay *Tr*, while the cathode is connected to ground through a resistor of 10 kilo-ohms and to −48 volts through a resistor of 1 kilo-ohm. When the subscriber's line is open, the potential at the "*b*" wire is −48 volts and such a potential is also present at the control grid of VA, whereby, owing to the higher potential at the cathode of VA, this tube is non-conductive and relay *Tr* is at rest. When the subscriber's loop is closed as a result of a call, the potential on the "*b*" wire becomes substantially equal to −16 volts, the rectifiers $S_1$, $S_2$, $S_3$ are made conductive, and the corresponding increase of potential at the grid of VA causes the tube to conduct, whereby *Tr* operates.

The numbered arrows at the control grid of VA, the junction point of $S_3$ and $S_2$, the junction point of $S_2$ and $S_1$, indicate that these respective points are each multipled to a corresponding number of circuits, there being 4 rectifiers such as $S_3$, $4 \times 5$ rectifiers such as $S_2$, and $4 \times 5 \times 5$ rectifiers such as $S_1$. A more detailed disclosure of this circuit is shown in Fig. 2 where the four rectifiers $S_3$ are shown with one of these rectifiers connected to five of the $S_2$ rectifiers each of which is shown connected to five of the $S_1$ rectifiers. The $S_1$ rectifiers are each connected through an $S_4$ rectifier to a contact of one of the relays A*a* to A*e* which lead to the make contact H$a_4$, the armature of which is connected to negative battery. Each of the lines leading from $S_1$ rectifiers go to a line circuit through the resistor shown in Fig. 1, but omitted in Fig. 2. With this arrangement, the grid of VA is normally coupled to a hundred line circuits, such as the one shown, and the rectifiers serve to decouple the various line circuits from one another.

Via contact *t* of relay T*r* in the make position, relay H*ar* is energized through its break contact H$a_2$. This relay locks to ground through make contact H$a_1$ and break contact $K_1$ of relay K*r*. As a result of the operation of relay H*ar*, −48 volts is now connected through make contact H$a_4$ to a set of five contacts A$a_0$–$e_0$ associated respectively with the relays A*ar*–A*er*. Each of these last contacts is connected to the cathode of twenty rectifiers, such as $S_4$, the anodes of which are connected to the *c* wires of the hundred line circuits. This means that the potential of −16 volts which had appeared on the *c* wire of the calling line circuit will now be replaced by −48 volts whereby the tube VA will no longer be conductive and relay T*r* will release. Relay T*r* is a fast releasing relay, so that relay H*br* has no opportunity to energize through make contact H$a_2$.

The release of relay T*r* causes the operation of relay A*ar* through break contacts A$e_3$, A$a_2$, A$b_3$, A$c_3$, A$d_3$, make contact H$a_3$ and break contacts H$b_4$ and *t*. Relay A*ar* locks through make contact A$a_1$, break contacts A$b_2$, A$c_2$, A$d_2$, A$e_2$ and $K_1$. If the calling line is in the group of 20 lines which corresponds to relay A*ar*, due to the opening of contact A$a_0$, a potential of −16 volts will again be able to reach the grid of tube VA whereby relay T*r* will again operate. This will result in relay H*br* being energized through make contacts *t* and H$a_2$ and break contact H$b_2$. Relay H*br* locks through make contact H$b_1$ and break contact $K_1$.

If the calling line was not included in the group of 20 lines corresponding to relay A*ar*, relay T*r* would not have been operated upon the energization of relay A*ar* and the latter operation would have permitted the subsequent operation of relay A*br* through make contact A$a_2$, break contacts A$b_3$, A$c_3$, A$d_3$, make contact H$a_3$ and break contacts H$b_4$ and *t*. Relay A*br* would have locked through make contact A$b_1$, break contacts A$c_2$, A$d_2$, A$e_2$ and $K_1$ and caused the release of relay A*ar* at break contact A$b_2$. If the calling line had been in the group of 20 lines corresponding to relay A*br*, then the opening of contact A$b_0$ would have resulted in the operation of relay T*r* and the subsequent operation of relay H*br* in exactly the same way as described above. It will be clear that if relay T*r* does not operate as a result of the operation of relay A*br*, then relay A*cr* will be energized while relay A*br* will be released, and so on until relay T*r* responds. It should be observed that relay T*r* is also a fast operating relay, whereby it energizes so quickly that there is no possibility for the following code relay to be operated, so that when relay T*r* responds after the energization of relay A*ar*, relay A*br* will have no opportunity to energize and out of the five relays A*ar*–A*er*, relay A*ar* will be the only one to be and remain energized.

The operation of relay H*br* will cause −48 volts to be applied through make contacts H$b_5$ to five contacts B$a_0$–$e_0$, each of which is connected to the cathodes of four rectifiers such as $S_5$, the anodes of which are individually connected to the junction points of rectifiers such as $S_1$ and $S_2$. It is clear that this connection will again re-establish a potential of −48 volts at the grid of tube VA whereby relay T*r* will again release, and, as a consequence, relay B*ar* will be energized through break contacts B$e_3$, B$a_2$, B$b_3$, B$c_3$, B$d_3$, make contact H$b_3$ and break contacts H$c_2$ and *t*, in a way exactly similar to that in which relay A*ar* was operated. The opening of contact B$a_0$ will suppress the potential of −48 volts connected to the cathodes of four rectifiers such as $S_5$, and if the anode of one of these rectifiers happens to be connected to the *c* wire of the calling line through a rectifier such as $S_1$, a potential of −16 volts will again be able to reach the grid of tube VA, whereby relay T*r* will again operate. If not, relay B*br* will be operated while relay B*ar* will be released, and so on until relay T*r* is energized, whereby the last relay of the B group which was energized will remain locked in a manner similar to that described in connection with relay A*ar*.

Since relay H*br*, as well as relay H*ar*, are now operated, the renewed energization of relay T*r* will produce the operation of relay H*cr* through make contacts *t*, H$a_2$, H$b_2$ and break contact H$c_2$, and this relay will lock through make contact H$c_1$ and break contact $K_1$. Again, the potential of −16 volts at the grid of tube VA will be suppressed, this time due to the closure of make contact H$c_5$ leading to the contacts $ca_0$–$d_0$ and the rectifiers, such as $S_6$. Relay T*r* will again release, and this will result in the successive energizations of the relays of the C group until relay T*r* is again operated.

At this moment, one relay in each of the A, B, and C groups is energized and the operated combination characterizes the identity of the calling line in a non-ambiguous manner. It can easily be verified that in the event of simultaneous calls, there will be no mixing of codes.

The code used is of the form ${}_1C_5\,{}_1C_5\,{}_1C_4$ which means that a hundred different combinations each of which characterizes a particular line can be obtained with fourteen elements, which for a hundred different combinations represents the smallest number of elements for any code with a constant number of operated elements, i.e. 3 in this case.

When relay T*r* again operates after relay H*cr* has operated, this will cause the operation of relay H*dr* through make contacts *t*, H$a_2$, H$b_2$ and H$c_2$. This operation can now be used in any desired manner (not shown) to initiate the selection of a line finder having access to the group of the calling line and which can then be set on this line. It will be assumed that the line finders are arranged in groups forming a multi-switch of the type disclosed in the application of J. Kruithof et al., Serial No. 280,252, filed April 3, 1952. The multiswitch is of the crossbar type, has a plurality of inlets and a hundred outlets and comprises a first set of 25 select bars plus a second set of 2 auxiliary select bars. By operating one select bar out of each set, a selection of one out of fifty outlets can be accomplished. When access to a suitable multi-switch has been obtained by means not shown, make contact $Hd_2$ will apply ground to the pyramid contact arrangement shown in the figures. If it is assumed that relays *Aar*, *Bar* and *Car* have been operated and therefore identify the calling line, ground will be applied through make contacts $Ba_3$ and $Aa_3$ to the electro magnet $VM_1$ which is one out of the 25 corresponding to the 25 select bars. Owing to the mechanical arrangement, the contact V will be closed as a result of the displacement of the select bar corresponding to the electromagnet $VM_1$, as it would in response to the displacement of any select bar out of the first set.

Therefore, through make contacts V and $Ca_3$, a ground will be applied to the electromagnet $VM_{26}$ which is one out of the two controlling the two auxiliary select bars, and this electromagnet will also be operated.

At this moment, both the electromagnets $VM_1$ and $VM_{26}$ being operated, the corresponding select bar and auxiliary select bar are displaced and the displacement of the actuating and hold bar corresponding to the seized individual line finder part of the multi-switch will effect through-connection to the line circuit of the calling line, but since a selection of one out of fifty only has been made, there still remains a selection of one out of two to be made which is accomplished, as explained in the above mentioned application, Serial No. 280,252, by displacing the actuating and hold bar in one sense or in the other.

Each of the actuating and hold bars corresponding to an individual line finder is provided with a hold magnet of which a contact H is shown. This hold magnet will be energized as soon as the select bars have been displaced and as a result, ground will be applied through make contacts H and $Ca_4$ to the electromagnet $SH_1$. As explained in the above mentioned application, Serial No. 280,252, this electromagnet is one out of two which is used to perform the actual displacement of an actuating and hold bar of which the hold magnet has been operated. The operation of $SH_1$ will result in the actuating and hold bar being displaced in one sense, while the operation of $SH_2$ would result in the bar being displaced in the opposite sense, so that finally a selection of one out of a hundred will be accomplished.

As soon as a line finder is connected to the line circuit of the calling line of which the identity is registered in the circuit shown on the figure, a potential of −48 volts will be applied through the line finder to the *c* wire of the calling line, whereby relay *Tr* will again release. The release of relay *Tr* will now cause ground to be applied through break contact *t* and make contact $Hd_1$ to relay *Kr* which will be energized, whereby all attracted relays will be released due to the temporary opening of contact $K_1$. Both relays *Hdr* and *Kr* should be relatively slow-releasing, the first to permit the temporary energization of the second and the second to permit the release of all other operated relays. The identification circuit is therefore fully released and ready to identify a new calling line. If several lines had been calling simultaneously, one would have received preference for being identified in view of the cyclic scanning arrangement in stages, but as soon as all relays have released in the manner explained, relay *Tr* will immediately reoperate and the identification of the next line will be made.

If for some reason the line loop is opened while the scanning operation is in progress in any one group, relay *Tr* cannot operate or must release and the next relays in the group operate in turn until the last one energizes. If it is assumed that the line loop is opened while the sequential operation of the relays of the A group are taking place, relay *Aer* will finally operate and ground will be applied to relay *Kr* through break contacts *t*, $Hb_4$, make contact $Ha_3$, break contacts $Ad_3$, $Ac_3$, $Ab_3$, $Aa_2$ and make contact $Ae_3$ to cause the energization of relay *Kr*. As explained in connection with the normal release, the operation of relay *Kr* will put the circuit back to normal. It should also be remarked that if due to some faulty condition, relay *Tr* fails to attract at the proper moment with sufficient speed, the last relay of a group will finally be operated with the same results as in the case of a premature release. The release of the circuit will also take place if the subscriber hangs up after relay *Hdr* has been operated.

Although an embodiment of the identification of a calling line has been described, it will be understood that the same circuit might be used to select a free outlet within a group of marked outlets of a group selector switch, or in the case of a final selector, to identify a line to which a connection is wanted and to which a marking potential is applied.

The electrical identification system described can be used to identify any electrical circuits out of a group. It may also be observed that although relay counters have been shown, other kinds of elements could be used, such as gas discharge tubes or other electric, electronic or magnetic devices. As other electro-mechanical elements, step-by-step switches could be used, e.g. with a code ${}_1C_{10}\ {}_1C_{10}$ two step-by-step switches having at least ten positions, and a number of wipers depending on the code used for the control of a crossbar switch, would be necessary.

While the principles of the invention have been described above in connection with specific apparatus, it is to be clearly understood that this description is made only by way of example and not as a limitation on the scope of the invention.

What is claimed is:

1. Electrical identification system, comprising a common detector connected to each of a plurality of individual points which are divided in *n* ($n>1$) different ways into $M_1, M_2 \ldots M_n$ groups, where $M_1 \times M_2 \times \ldots M_n$ equals the total number of said plurality of individual points, a plurality of $M_1+M_2+ \ldots M_n$ means, one for each group, for disabling the connection between said individual points and said common detector, means responsive to a signal received by said detector for controlling said disabling means, whereby during absence of a signalling condition on said individual points none of the disabling means are effective, means in said control means responsive to a signalling condition being detected on any one or more of said points for operating said control means to cause said disabling means successively to perform *n* selections, during each of which all but one out of $M_1, M_2 \ldots M_n$ groups of individual points are successively excluded from access to the common detector.

2. Electrical identification system, according to claim 1, further comprising means in said disabling means operable during each of said *n* selections to give access to successive groups in a time sequencial order until a group is reached in which a signalling condition exists, and means responsive to said common detector for stopping the action of said disabling means when a signal is received by said detector.

3. Electrical identification system, according to claim 2, in which the means in the disabling means for giving access to successive groups of individual points is adapted to eleminate all but one out of $M_1$ groups for the rest of the selecting process during the first of the *n* selection and to repeat this elimination process for the remaining points during each of the following $n-1$ selections until one only of said plurality of points remains effectively connected to the common detector.

4. Electrical identification system, according to claim 3, in which the control means comprise *n* multistable devices having respectively at least $M_1, M_2 \ldots M_n$ stable conditions, one such device being operated during each selection.

5. Electrical identification system, according to claim 4, further comprising means in the control means for driving each multistable device during its operation sequentially through its stable conditions, and means operable in each of these stable conditions for giving one group access to the common detector to the exclusion of all other groups, until a group is found, in which a signalling condition exists.

6. Electrical identification system, according to claim 3, further comprising means for restoring said control means upon removal of the signalling condition from the selected point.

7. Electrical identification system comprising a plurality of individual points, a common point, a plurality of gates, means including said gates for connecting said common point to each of said individual points, said gates being arranged in stages, each stage having a plurality of gates, the gates of the stages beyond the first stage being arranged in sets with the gates of each set being connected to a particular gate of the preceding stage which is different from the gates to which the other sets are connected and to all the gates of a set in the next succeeding stage, a plurality of control points for each stage, there being as many control points in each stage as there are sets of gates in that stage, means for controlling corresponding gates in the sets of each stage from respective control points associated with that stage, a detector connected to said common point and responsive to a signal received from any of said individual points, a multistable electrical device associated with each stage having at least as many stable conditions as there are control points at each stage, means for normally applying a first electrical condition to all said control points, means responsive to said first electrical condition for making all gates unidirectionally conductive, all in the same sense with respect to said common point, whereby a signalling condition at one or more of the individual points will actuate the detector, means responsive to the said actuating of said detector for applying a second electrical condition to all the gates at one stage, said means responsive to said first electrical condition also being responsive to said second electrical condition for making the gates at said one stage non-conductive, whereby the detector releases, means responsive to the release of said detector for causing the multistable device corresponding to the stage of non-conductive gates to change successively from each of its stable conditions to the next, thereby applying said first electrical condition separately to each successive control point at said stage until the detector is again actuated, and means responsive to a succeeding operation of said detector for causing said multistable device to remain in the position which permitted the detector to be actuated and for causing said second electrical condition to be applied to all the gates at another stage, whereby these gates become non-conductive and the detector is again released with corresponding results, these operations being continued until the last of said multistable devices is set into the position which permits the detector to be actuated, whereby the various positions of said multistable devices indicate the identity of an individual point at which a signalling condition was originated, the disappearance of said signalling condition causing the release of said detector which in turn causes said first electrical condition to be again applied to all control points.

References Cited in the file of this patent

UNITED STATES PATENTS

| | | |
|---|---|---|
| 2,424,243 | Lowell | July 22, 1947 |
| 2,597,007 | Kruithof et al. | May 20, 1952 |
| 2,600,502 | Holden | June 17, 1952 |
| 2,682,277 | Spencer | Feb. 10, 1953 |
| 2,691,067 | Buchner | Oct. 5, 1954 |
| 2,695,928 | Toel et al. | Nov. 30, 1954 |
| 2,697,750 | Buchner et al. | Dec. 21, 1954 |